United States Patent [19]

Miyagawa et al.

[11] Patent Number: 4,610,859

[45] Date of Patent: Sep. 9, 1986

[54] PROCESS FOR PRODUCING SILICON HYDRIDES

[75] Inventors: Hiroharu Miyagawa; Masayoshi Itoh, both of Yokohama; Tomohiro Abe, Yokosuka; Kenji Iwata; Kyogo Koizumi, both of Yokohama, all of Japan

[73] Assignee: Mitsui Toatsu Chemicals, Inc., Tokyo, Japan

[21] Appl. No.: 686,893

[22] Filed: Dec. 27, 1984

[30] Foreign Application Priority Data

Dec. 29, 1983 [JP] Japan .................. 58-245772
Dec. 29, 1983 [JP] Japan .................. 58-245773
Feb. 25, 1984 [JP] Japan .................. 59-34830
Jun. 11, 1984 [JP] Japan .................. 59-119380

[51] Int. Cl.$^4$ .................................. C01B 33/04
[52] U.S. Cl. .................................... 423/347
[58] Field of Search ........................... 423/347

[56] References Cited

U.S. PATENT DOCUMENTS 2,551,571  5/1951  Culbertson .................. 423/347

FOREIGN PATENT DOCUMENTS 498256  10/1953  Canada .................. 423/347
585154  10/1959  Canada .................. 423/347

OTHER PUBLICATIONS

Chemical Abstracts, "Reaction Mechanism of Silane Formation", vol. 19, p. 1670, C.A. 17, 1392.
J.A.C.S., 57, 1349 (1935).

Primary Examiner—John P. Sheehan
Attorney, Agent, or Firm—Fisher, Christen & Sabol

[57] ABSTRACT

A process for producing silicon hydrides represented by the general formula $Si_nH_{2n+2}$ wherein n is a positive integer of 1 to 6, which comprises reacting a silicon-containing alloy with an aqueous solution of an acid in the presence of at least one inert organic solvent having a boiling range of from −60° C. to 250° C.

22 Claims, No Drawings

PROCESS FOR PRODUCING SILICON HYDRIDES

This invention relates to a process for producing silicon hydrides of the general formula $Si_nH_{2n+2}$ wherein n is a positive integer of 1 to 6 by reacting a silicon-containing alloy with anacid.

With the recent advance in the electronics industry, there has been a striking increase in the demand for silicon used in semiconductors, such as crystalline silicon and amorphous silcon. The silicon hydrides $Si_nH_{2n+2}$ have recently gained increasing importance as materials for production of such silicon for semiconductors. Particularly, monosilane ($SiH_4$), disilane ($Si_2H_6$), and trisilane ($Si_3H_8$) are expected to have a greatly increased demand as a material for solar cell semiconductors, electrophotographic materials, thin film transistors, etc.

Some methods shown below have previously been known for the production of silicon hydrides.

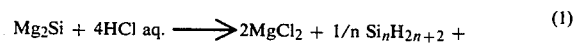

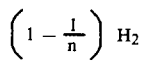

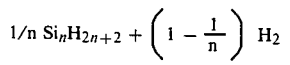

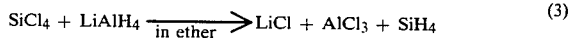

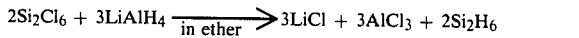

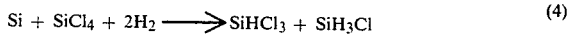

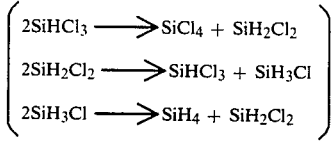

Basically, the method (1) comprising reacting a silicon-containing alloy such as magnesium silicide with an acid in aqueous solution is best and most easily practicable among the above known methods because it does not require an expensive reducing agent such as $LiAlH_4$ as in the method (3) nor low temperatures or elevated pressures as in the reactions (2) and (4) and in the production of disilane ($Si_2H_6$), and it does not require expensive hexachlorodisilane ($Si_2Cl_6$) as in the reaction (3).

The method (1), however, has the serious defect that the conversion of silicon in the silicon alloy to highly useful silicon hydrides such as monosilane ($SiH_4$), disilane ($Si_2H_6$) and trisilane ($Si_3H_8$) (this conversion is referred to hereinbelow as the yield) is low.

The low yield is believed to be due to the formation of a by-product silicon compound having a siloxane linkage which cannot be avoided because of the inherent mechanism of the reaction shown by the following scheme.

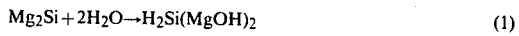

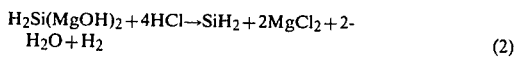

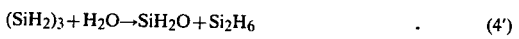

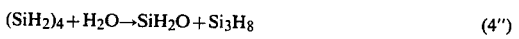

Specifically, the intermediate $H_2Si(MgOH)_2$ formed by reaction (1) reacts, for example, with hydrochloric acid to form an $SiH_2$ radical (2) which immediately polymerizes (3) and subsequently undergoes hydrolysis to form various silanes and prosiloxanes ((4), (4'), (4"), . . . ) [Z. Anorg. Allgem. Chem., 303, 283 (1960), and J.A.C.S., 57, 1349 (1935)].

From the above reaction mechanism which seems to be correct, it is anticipated that the total yield of monosilane and disilane will be considerably low. In fact, the total yields of monosilane and disilane which have so far been reported are only on the order of 30%.

Accordingly, if the yield becomes close to 40%, it would not be easy, therefore, to increase it further by several percent by the conventional methods.

When the present inventors reacted a silicon alloy and an acid in accordance with the method (1), a viscous black solid product was always formed in a large amount during the reaction. This solid product was presumed to be a certain kind of polymer derived from silicon. It firmly adhered to the inner wall, etc. of the reactor, or accumulated in a large amount as a mass in the reaction solution. When the amount of the solid product formed further increased as the reaction proceeded, the heat of the reaction was difficult to remove through the inner reactor wall, and the reaction temperature was difficult to control. Or the stirring of the reaction mixture became impossible. The reaction had to be stopped at such a time, and a stable operation for a long period of time could not be secured.

Accordingly, it is an object of this invention to provide a process for converting silicon in a silicon alloy into highly utilizable silicon hydrides in high yields.

Another object of this invention is to provide a process for producing silicon hydrides while drastically reducing the amount of a viscous solid by-product which, in the conventional method, is formed in a large amount and causes various troubles Still another object of this invention is to provide a process for producing silicon hydrides which permits an easy control of temperature and can be operated for long periods of time stably on a commercial scale.

Further objects of this invention will become apparent from the following description.

In accordance with this invention, there is provided a process for producing silicon hydrides represented by the general formula $Si_nH_{2n+2}$ wherein n is a positive integer of 1 to 6, which comprises reacting a silicon-containing alloy with an aqueous solution of an acid in an inert organic solvent having a boiling range of $-60°$ C. to $250°$ C.

The silicon hydrides produced by the process of this invention are monosilane, disilane, trisilane, tetrasilane, pentasilane and hexasilane represented by the general formula $Si_nH_{2n+2}$ in which n is a positive integer of 1 to 6.

The silicon-containing alloy used in the process of this invention is an alloy composed of at least two metals including silicon (to be referred to as a silicon alloy or simply an alloy). Specific examples include $Mg_2Si$, $CaSi$, $Ca_3Si_2$, $Li_6Si_2$, $La_3Si_3$, $Ce_3Si_3$, $BaCaSi$, $Mg_2SiNi$, $Mg_2SiAl$, $Mg_2Si_2Ba$, $CeMg_2Si_2$, $Mg_6Si_7Cu_{16}$ and $Mg_3Si_6Al_8Fe$. Of these, silicon alloys containing magnesium are preferred, and $Mg_2Si$ is most preferred. These silicon alloys may be used singly or as a mixture of two or more. The particle diameter of the alloy is not particularly restricted, but is desirably as fine as possible. However, for economical or handling reasons, it is preferably in the range of about 20 to 300 mesh.

The silicon alloy used in this invention is easily available commercially. Or it may be produced by known methods. For example, $Mg_2Si$ can be easily obtained by mixing a silicon powder and magnesium, and heating the mixture in a hydrogen stream at 500° to 1000° C., preferably 550° to 850° C., for about 4 hours.

According to this invention, the above silicon alloy is reacted with an aqueous solution of an acid. The acid may be any acid which is soluble in water even partly. Examples include inorganic acids such as hydrochloric acid, hydrobromic acid, hydroiodic acid, hydrofluoric acid, sulfuric acid, pyrophosphoric acid, phosphoric acid, metaphosphoric acid and nitric acid, and organic acids such as acetic acid, formic acid, oxalic acid, propionic acid, malonic acid, succinic acid, glutaric acid, adipic acid, benzoic acid and phenol. For economical reasons, hydrochloric acid and sulfuric acid are especially preferred among these. The concentration of the acid in the aqueous solution is not particularly limited in this invention, but from the viewpoint of the yield of silicon hydrides, is preferably in the range of about 1 to 50% by weight.

The ratio of the silicon alloy and the acid in the above reaction is desirably the reaction molar equivalents for economical reasons, but to increase the yield of the silicon hydrides, the amount of the acid is rendered excessive to some extent. For example, in the reaction of $Mg_2Si$ with the acid, the molar ratio of $H^+/Mg_2Si$ is adjusted to a value larger than the reaction molar equivalent ($=4.0$), preferably at least 4.4, more preferably at least 8.0. If the reaction is carried out while this molar ratio ($H^+/Mg_2Si$) is kept at the reaction molar equivalent ($=4.0$) or less, the unreacted silicon alloy particles frequently remain in the reactor. This not only reduces the yield of silicon hydrides, but also is undesirable because the unreacted alloy particles are accumulated in the reaction system.

On the other hand, when the acid is used in large excess, it is undesirable to discard the unreacted acid present in the reaction residue in view of the economy of the process, and it should be recycled. It may be possible in this case to feed a fresh supply of the acid in an amount corresponding to the amount of the acid consumed by the reaction with the alloy to the reaction residue. However, since too high concentrations of the by-product magnesium salt dissolved in the aqueous acid solution to be fed to the reactor prevent smooth proceeding of the reaction, the salt concentration is preferably maintained at 10% by weight or less.

In the process of this invention, the silicon-containing alloy described above is reacted with an aqueous solution of the acid in the presence of at least one inert organic solvent having a boiling range of $-60°$ C. to 250° C., preferably $-60°$ C. to 150° C. The inert organic solvent, as used herein, denotes an inert organic solvent which under the reaction conditions, does not substantially react chemically with other components present in the reaction system such as the acid and the resulting silicon hydrides, and is itself substantially stable. It is selected from the group consisting of ethers, hydrocarbons, halogenated hydrocarbons, ketones, aldehydes, amines, silicon hydrides and organosilicon compounds, and has a boiling range of $-60°$ C. to 250° C. either singly or as a mixture.

The ethers used as the solvent in the process of this invention are linear and/or cyclic compounds having at least one ether group (C—O—C linkage) in the molecule. Specific examples include dimethyl ether, diethyl ether, ethyl methyl ether, di-n-propyl ether, di-i-propyl ether, di-n-butyl ether, methyl n-propyl ether, methyl i-propyl ether, methyl n-amyl ether, ethyl n-butyl ether, ethyl n-hexyl ether, di-i-amyl ether, ethyl 1-chloroethyl ether, ethylene glycol dimethyl ether, diethylene glycol dimethyl ether, triethylene glycol dimethyl ether, vinyl ethyl ether, 2-methoxy-2-butene, 3-ethoxy-1-butene, tetrahydrofuran, dioxane, trimethylene oxide, 2-methyl-1,3-epoxypropane, diphenyl ether, anisole, 1,1-dimethoxymethane and 1,1-diethoxyethane.

The hydrocarbons used as the solvent in the process of this invention are saturated or unsaturated hydrocarbons having about 1 to 20 carbon atoms. Specific examples include ethane, propane, butane, pentane, hexane, heptane, octane, 2-methylpropane, 3-methylbutane, 2-methylhexane, 2,2-dimethylpentane, 2,3,3-trimethylbutane, propylene, 1-butene, cis-2-butene, 1-hexene, 1-heptene, 1-octene, 4,4-dimethyl-1-pentene, 1,2-butadiene, cyclohexane, cyclohexene, benzene, toluene, ethylbenzene, xylene and methoxybenzene.

Examples of the halogenated hydrocarbons include monochloropentafluoroethane, dichlorodifluoromethane, octafluorocyclobutane, dichlorotetrafluoroethane, dichloromonofluoromethane, trichlorofluoromethane, trichlorotrifluoroethane, tetrachlorodifluoroethane, dichloroethane, methyl chloride, methyl bromide, isopropyl fluoride, isopropenyl bromide, tetrafluorodibromoethane, difluoroethane, benzene hexachloride, chlorobenzene, fluorobenzene, hexafluorobenzene and benzotrifluoride. The fluorinated hydrocarbons are especially preferred.

Examples of the ketones used as the solvent in the process of this invention include acetone, ethyl methyl ketone, diethyl ketone, chloroacetone, ethyl vinyl ketone, methyl isobutyl ketone and dimethyl diketone.

Examples of the aldehydes used as the solvent in the process of this invention include formaldehyde, acetaldehyde, propionaldehyde, acrolein, maleinaldehyde, ethoxyaldehyde and aminoacetaldehyde.

Examples of the amines used as the solvent in the process of this invention include methylamine, ethylamine, hexylamine, diethylamine, trimethylamine, ethylenediamine, allylamine, isopropanolamine and aniline.

Examples of the silicon hydrides used as the solvent in the process of this invention are disilane, trisilane, tetrasilane, pentasilane and hexasilane.

Examples of the organosilicon compounds used as the solvent in the process of this invention denote organosilane compounds resulting from substitution of an alkyl group, an alkoxy group, a halogen atom, etc. for at least one hydrogen atom of silicon hydrides, organohalosilane compounds and the above derivatives of siloxane compounds having an Si-O-Si linkage. Specific examples include monomethylsilane, dimethylsilane, trimethylsilane, tetramethylsilane, diethylsilane, triethylsilane, tetraethylsilane, trimethylethylsilane, trimethylbutylsilane, dimethyldiethylsilane, hexamethyldisilane, monomethyldifluorosilane, monomethyltrifluorosilane dimethyldifuorosilane, trimethylfluorosilane, ethyltrifluorosilane, diethyldifluorosilane, triethylfluorosialne, diethylfluorochlorosilane, trimethylmethoxysilane, phenyltrimethylsilane, disilyl ether, trimethylethoxysilane, tetraethoxysilane, tetramethoxysilane, 1,1,3,3-tetramethyldisiloxane, hexamethyldisiloxane, and silicone oils.

It should be understood that the organic solvents as used in this invention denote not only the hydrocarbons, etc., but also the silicon hydrides and the organosilicon compounds as their derivatives.

When the silicon hydride is used as the inert organic solvent, it may be obtained separately as a reagent. But according to a preferred embodiment, silicon hydrides such as disilane, trisilane, tetrasilane and other higher silanes obtained by the process of this invention may be used partly either singly or as a mixture as a solvent for the next reaction batch.

These inert organic solvents may be used singly or in combination. In using mixed solvents, compounds of the same class, for example dimethyl ether and diethyl ether, may be mixed, or compounds of different classes, for example dimethyl ether and toluene or dimethylsilane and benzene, may be mixed. It is possible to combine solvents having different boiling points, or different degrees of affinity for the aqueous medium. When compounds which are gaseous at room temperature and atmospheric pressure, such as dimethyl ether, ethane, and disilane, are used, they may be liquefied at low temperatures or elevated pressures.

The amount of the inert organic solvent used in the process of this invention is usually 0.001 to 1000 times, preferably 0.01 to 20 times, more preferably 0.1 to 5 times, especially preferably 1 to 5 times, the volume of the aqueous acid solution in the reaction system.

The reaction operation for practicing the process of this invention will now be described.

Basically, the reaction in the process of this invention is a liquid-solid reaction carried out by contacting the silicon-containing alloy (particles) with the aqueous acid solution in the presence of the inert organic solvent described above.

Usually, therefore, the aqueous acid solution and the inert organic solvent become a continuous phase, and the silicon-containing alloy particles are dispersed in it as a disperse phase. The reaction is considered to proceed near the surfaces of the alloy particles.

The characteristic feature of the present invention lies in the presence of the inert organic solvent during the reaction of the silicon alloy with the aqueous acid solution, and there is no restriction on other modes of the reaction. Specifically, the reaction may be carried out batchwise, semi-batchwise or continuously. Various methods can be used in feeding the aforesaid reaction components. For example, in the case of the batch process, there can be employed (i) a method in which the aqueous acid solution and the solvent are fed into the reactor and the alloy is gradually fed, (ii) a method in which the aqueous acid solution, the solvent and the alloy are simultaneously fed into the reactor, and (iii) a method in which the aqueous acid solution is first fed, and the alloy suspended in the solvent is gradually fed into the aqueous acid solution. The same can be said with respect to the continuous process.

To achieve the objects of this invention, it is necessary that the inert solvent be present in as dispersed a state as possible in the reaction mixture of the silicon alloy and the aqueous acid solution, and the reaction proceed while maintaining this good dispersed state. For this purpose, it is desirable to provide as uniform a liquid phase as possible by (i) fully stirring the reaction solution and (ii) maintaining an emulsified state by using a homogenizer, ultrasonic device, an emulsifier, etc.

There is no particular restriction on the type of the emulsifier. Generally, surface-active agents are suitable. The surfactants may be ionic or nonionic. Examples include alkylsulfate ester sodium salts, sodium alkylbenzenesulfonates, alkylpyridinium sulfate salts, polyoxyethylene alkyl ethers and alkyltrimethylaminoacetic acids.

In practicing the process of this invention, an atmospheric gas is not always necessary. As required, however, it is possible to use an inert gas which does not react with the resulting silicon hydrides, such as hydrogen, helium, argon and nitrogen.

The reaction is usually carried out under atmospheric or elevated pressures, but can also be carried out under reduced pressures.

The reaction temperature is generally $-60°$ to $150°$ C., preferably $-50°$ C. to $100°$ C., more preferably $-50°$ C. to the temperature at which the solvent begins to boil.

The reaction in the process of this invention is an exothermic reaction (about 200 kcal/g-mole $Mg_2Si$) close to a combustion reaction, and thus requires efficient cooling in order to control the temperature within the above-specified range. Accordingly, the reactor used in this invention is desirably of a structure which has a large heat conducting area (cooling area), is equipped with an intense stirring means such as a homogenizer and can be effectively cooled. For example, it is a stirred tank-type reactor equipped with a multitubular heat-exchanger, a double-tube heat exchanger, etc. for internal or external heat exchanging. A tubular reactor may also be used. Water and ordinary coolants may be used as cooling media. Examples include water-methanol-brine, sodium chloride-brine, ethylene glycol-brine, ammonia, flon, methylene chloride and silicon oils. The temperature is controlled by sending such a coolant into the multitubular heat-exchanger and cooling the reactor.

Since the reaction is a solid-liquid heterogeneous reaction involving exotherm, it is necesssry to prevent localized overheating by fully performing stirring and cooling.

An especially preferred method of controlling the heat of the reaction is to provide a reflux condenser above the reactor (may be directly attached to the top of the reactor, or provided independently of the reactor), and circulating the solvent therethrough. When the reaction is carried out while circulating the solvent having a boiling point of not more than about $150°$ C., the resulting heat of the reaction can be removed as the heat of evaporation of the solvent, and by the selection of the solvent, temperature control at an arbitrary temperature becomes very easy.

The reaction in the process of this invention is very rapid, and even at a reaction temperature of $-60°$ to $0°$ C., the reaction of each of the alloy particles fed into the reaction system is rapidly terminated in several seconds to several minutes. The resulting monosilane (SiH$_4$) has a boiling point of $-110°$ C. and is not soluble in the reaction solution. Thus, at the above reaction temperature, monosilane is liberated as a gas out of the reaction system. The gas is therefore liquefied with liquid nitrogen and collected through a trap. When the reaction temperature is kept at a temperature below 0° C., for example at $-15°$ C., higher silicon hydrides such as disilane (Si$_2$H$_6$, bp. $-14.5°$ C.), trisilane (Si$_3$H$_8$, bp. 52.9° C.) and tetrasilane (Si$_4$H$_{10}$, bp. 109° C.) are not gasified, and therefore, are likely to be accumulated in the reactor as liquid. When it is desired to produce such higher silicon hydrides, these silicon hydrides should be recovered by heating the reaction mixture after the reaction to room temperature or to about 50° C. to strip the higher silicon hydrides as gases and separate them from the reaction system and then collecting them. During the reaction operation, a part of the reaction solution is taken out of the reactor and circulated, and the circulated reaction solution may be heated to perform the same stripping operation.

Separation of the recovered product gas mixture into its components and their purification may be carried out by known methods such as low temperature processing and the use of adsorbents.

According to another preferred embodiment of this invention, the reaction solution after the reaction is left to stand to separate it into a solvent layer having the resulting silicon hydrides dissolved therein and an aqueous acid solution layer nearly free from the silicon hydrides, and the solvent layer is distilled to recover the silicon hydrides.

When mere standing is not enough for separation of the reaction solution into a solvent layer and an aqueous acid solution layer, the separating efficiency and/or the separating speed may be increased by various methods, for example, the application of ultrasonic waves to the reaction solution, the passing of the reaction solution through a porous filter, the use of a surface-active agent, and the use of a centrifugal separator. These methods accelerate association of the dispersed liquid droplets.

As can be easily anticipated from their structural formula, silanes are hardly soluble in aqueous media such as an aqueous acid solution. Hence, the amount of silicon hydrides remaining in the aqueous acid solution is trace. In contrast, almost all of the resulting silicon hydrides remaining in the reaction solution are present dissolved in the solvent layer.

The solvent layer containing the silicon hydrides is distilled by an ordinary method to recover the silicon hydrides and separate the solvent. The aqueous acid solution is heat-treated to recover the dissolved solvent and traces of the silicon hydrides.

When the solvent and the aqueous acid solution do not easily form two layers, it is possible to distill the entire reaction solution without separation, and thereby to separate it into the solvent, the acidic aqueous solution and the resulting silicon hydrides.

The effect of the presence of the inert organic solvent in the process of this invention is remarkable, and the conversion of silicon in the silicon alloy to silicon hydrides increases greatly as compared with conventional processes which do not use such a solvent. No detailed reason has yet been assigned to the effect of the presence of the solvent which brings about a marked increase in conversion. It is presumed however that although marked exotherm which may cause decomposition of silicon hydrides occurs during the reaction of the silicon alloy with the acid, the solvent locally vaporizes to prevent local temperature elevation, namely the formation of hot spots, and that the resulting silanes are scarcely soluble in aqueous media such as the aqueous acid solution as is clear from their structural formulae but soluble in the solvent present in the reaction system, and therefore the solvent immediately dissolves the resulting silanes and protects them from the aqueous acid solution which becomes the cause of decomposition, and also always refreshes the surface of the silicon alloy for easy reaction with the acid.

The reaction temperature can be controlled very easily if the reaction is carried out while refluxing the solvent by using a reflux condenser.

Consequently, in the process of this invention the amount of a by-product black solid which constitutes a setback in increasing the scale of the manufacturing process or practicing the process continuously is drastically decreased. In addition, since a small amount of the black solid formed is not viscous, it does not adhere to the wall of the reactor during the reaction as is the case with conventional processes. It does not cause troubles, but is always present in the form of a slurry which can be easily handled during separation and removal. Thus, the present invention brings about the marked advantage that the manufacturing process can be increased in scale on a commercial basis and can be continuously operated for long periods of time, and silicon hydrides can be produced at low costs.

Basically, the process of this invention is for the production of silicon hydrides by using silicon-containing alloys. By the same technical concept, the process of this invention can give monogermane (GeH$_4$), digermane (Ge$_2$H$_6$), trigermane (Ge$_3$H$_8$), tetragermane (Ge$_4$H$_{10}$), pentagermane (Ge$_5$H$_{12}$) and hexagermane (Ge$_6$H$_{14}$) using germanium alloys. The technical concept of this invention can similarly be applied to the production of tin hydride (SnH$_4$), gallium hydride (GaH$_3$), phosphine (PH$_3$), diborane (B$_2$H$_6$) and arsenic hydride (AsH$_3$).

The following examples illustrate the preferred embodiments of the present invention.

EXAMPLE 1

A 300 ml cylindrical separable flask was charged with 200 ml of a 20% by weight aqueous solution of hydrochloric acid and 30 ml of diethyl ether. In an atmosphere of hydrogen gas, 6.0 g of magnesium silicide, Mg$_2$Si, (particle diameter 100 to 200 mesh; 78.2 mmoles-Si) was added to the mixture at a fixed rate over 40 minutes with stirring by a homogenizer (monophase 1/6HP motor; rotating speed 2,000 rpm). During this time, the solution was cooled with a cooling medium to maintain the reaction temperature at 0° C. The resulting gas was collected by a trap cooled with liquid nitrogen. After the reaction (it may be taken that the reaction nearly ends when the addition of magnesium silicide ended). The amounts of SiH$_4$, Si$_2$H$_6$ and Si$_3$H$_8$ in the collected gas were determined by gas chromatography. (Furthermore, after the reaction, 100 ml of diethyl ether was further added to the reactor kept at the reaction temperature, and the amounts of monosilane, disilane and trisilane dissolved in the ether layer were determined by gas chromatography.)

The determined amounts of monosilane, disilane and trisilane were 30.2, 7.4, and 2.4 mmoles, respectively. The total amount of these three silicon hydrides corresponded to 66.8% of silicon in the magnesium silicide submitted to the reaction.

EXAMPLES 2-7

The same procedure as in Example 1 was repeated except that dimethyl ether, di-n-butyl ether, triethylene glycol diethyl ether, 2,2-dichlorodiethyl ether, tetrahydrofuran or dioxane was used instead of diethyl ether (when dimethyl ether was used, the reaction was carried out at −39° C.) The results are shown in Table 1.

COMPARATIVE EXAMPLE 1

The procedure of Example 1 was repeated except that diethyl ether was not used. The results are shown in Table 1.

EXAMPLE 8-11

The procedure of Example 1 was repeated except that the amount of diethyl ether was changed to 2 ml, 5 ml, 10 ml and 200 ml. The results are shown in Table 1.

EXAMPLE 12

The procedure of Example 1 was repeated except that the reaction was carried out while refluxing diethyl ether (reaction temperature 35° C.) The results are shown in Table 1.

solved in the ether layer after the reaction were determined by gas chromatography.

The amounts of monosilane, disilane and trisilane determined were 801, 199 and 65 mmoles, respectively. The total amount of these three silicon hydrides corresponded to 59.4% of silicon in the magnesium silicide submitted to the reaction.

COMPARATIVE EXAMPLE 2

The procedure of Example 13 was repeated except that diethyl ether was not used, and hydrochloric acid and magnesium silicide were fed a fixed speed. With the progress of the reaction, a viscous black solid material formed and adhered to the wall of the separable flask or deposited as masses in the reactor. Nine hours after the initiation of the reaction, the control of the reaction temperature (to 0° C.) and the stirring of the reaction solution became difficult, and the reaction had to be stopped. The amount of magnesium silicide fed was 108 g (1408 mmoles-Si).

The amounts of monosilane, disilane and trisilane formed were 349, 86, and 27 mmoles, respectively. The total amount of the three silicon hydrides corresponded to 42.8% of silicon in the magnesium silicide submitted to the reaction.

TABLE 1

| | Solvent | | Amount of silicon hydrides formed (mmoles)s | | | Percentage of $SiH_4$, $Si_2H_6$ and $Si_3H_8$ based on silicon of the silicon alloy fed (%) |
|---|---|---|---|---|---|---|
| | Kind | Amount (ml) | $SiH_4$ | $Si_2H_6$ | $Si_3H_8$ | |
| Example | | | | | | |
| 2* | Dimethyl ether | 30 | 31.0 | 7.5 | 2.4 | 68.0 |
| 3 | Di-n-butyl ether | " | 25.1 | 6.1 | 2.0 | 55.4 |
| 4 | Triethylene glycol diethyl ether | " | 24.9 | 6.2 | 2.0 | 55.4 |
| 5 | 2,2-Dichlorodiethyl ether | " | 26.6 | 6.6 | 2.2 | 59.3 |
| 6 | Tetrahydrofuran | " | 27.2 | 6.7 | 2.2 | 60.4 |
| 7 | Dioxane | " | 23.0 | 5.6 | 1.8 | 50.6 |
| 8 | Diethyl ether | 2 | 26.8 | 6.7 | 2.1 | 59.5 |
| 9 | Diethyl ether | 5 | 27.5 | 6.8 | 2.2 | 61.0 |
| 10 | Diethyl ether | 10 | 27.9 | 6.9 | 2.4 | 62.5 |
| 11 | Diethyl ether | 200 | 30.4 | 7.1 | 2.5 | 66.6 |
| 12** | Diethyl ether | 30 | 28.0 | 6.9 | 2.2 | 61.9 |
| Comp. Ex. | | | | | | |
| 1 | None | 0 | 19.2 | 4.8 | 1.4 | 42.2 |

*The reaction temperature was −30° C.
**The reaction temperature was 35° C.

EXAMPLE 13

Into a 2-liter separable flask containing 200 ml of diethyl ether were fed a 30% by weight aqueous solution of hydrochloric acid at a rate of 1.5 ml/min. under an atmosphere of hydrogen. From a separate opening, the same magnesium silicide as used in Example 1 was introduced into the flask simultaneously at a rate of 0.2 g/min. The reaction was carried out with stirring while maintaining a reaction temperature of 0° C.

Fifteen hours after starting the feeding of hydrochloric acid and magnesium silicide, the reaction (feeding) was stopped. As a result of the reaction, a slurry-like black solid material formed in the reaction solution, but did not at all affect the proceeding of the reaction. The amount of magnesium silicide fed was 180 g (2346 mmoles-Si). The product gas was collected by a trap cooled with liquid nitrogen. After the reaction, the amounts of monosilane, disilane and trisilane, in the collected gas were determined by gas chromatography. The amounts of monosilane, disilane and trisilane dis-

EXAMPLE 14

The same apparatus as used in Example 1 was charged with 200 ml of a 20% by weight aqueous solution of hydrochloric acid and 30 ml of n-pentane. In an atmosphere of hydrogen, the mixture was stirred, and meanwhile 6.0 g of magnesium silicide (particle diameter 100 to 200 mesh; 78.2 mmoles-Si) was continuously added at a constant rate of 0.15 g/min. for 40 minutes. During this time, the reaction temperature was maintained at 0° C. by cooling the reaction solution with a cooling medium. The product gas was collected by a trap cooled with liquefied nitrogen. After the reaction (after the end of feeding magnesium silicide), the amounts of monosilane, disilane and trisilane in the collected were determined by gas chromatography. After the reaction, 100 ml of n-pentane was further added to the reactor while maintaining the reaction temperature, and the amounts of monosilane, disilane and trisilane dissolved in the n-pentane layer were determined by gas chromatography.

(frequency 28 KHz) was irradiated further. The results are shown in Table 2.

TABLE 2

| Example | Solvent Kind | Solvent Amount (ml) | Amount of silicon hydrides SiH$_4$ | Amount of silicon hydrides Si$_2$H$_6$ | Amount of silicon hydrides Si$_3$H$_8$ | Percentage of SiH$_4$, Si$_2$H$_6$ and Si$_3$H$_8$ based on silicon in the silicon alloy fed (%) |
|---|---|---|---|---|---|---|
| 15* | n-Butane | 30 | 28.1 | 6.9 | 2.3 | 62.4 |
| 16 | n-Pentane | " | 24.2 | 5.9 | 1.9 | 53.3 |
| 17 | Benzene | " | 26.0 | 6.4 | 2.1 | 57.7 |
| 18 | Cylcohexane | " | 23.2 | 5.7 | 1.9 | 51.5 |
| 19 | Triflourotrichloroethane | " | 25.3 | 6.2 | 2.0 | 55.9 |
| 20 | n-Pentane | 5 | 26.0 | 6.3 | 2.2 | 57.8 |
| 21** | " | 30 | 26.2 | 6.5 | 2.1 | 58.2 |
| 22*** | " | " | 28.5 | 7.0 | 2.2 | 63.2 |
| 23*** | " | " | 28.6 | 7.1 | 2.2 | 63.2 |
| 24*** | " | " | 27.3 | 6.7 | 2.2 | 60.5 |
| 25*** | " | " | 28.3 | 7.1 | 2.2 | 62.8 |

*The reaction temperature was −30° C.
**The reaction temperature was 36° C.
***An emulsifier was used.

The amounts of the monosilane, disilane and trisilane determined were 28.1, 6.9, and 2.2 mmoles, respectively. The total amount of the three silicon hydrides corresponded to 62.0% of silicon in the magnesium silicide submitted to the reaction.

EXAMPLES 15–19

The procedure of Example 14 was repeated except that n-butane, n-pentane, benzene, cyclohexane and trifluorotrichloroethane were used respectively instead of n-pentane. In the case of using n-butane, the reaction temperature was maintained at −30° C. The results are shown in Table 2.

EXAMPLE 20

The procedure of Example 14 was repeated except that the amount of n-pentane was changed to 5 ml. The results are shown in Table 2.

EXAMPLE 21

The procedure of Example 14 was repeated except that the reaction was carried out while refluxing n-pentane at a reaction temperature of 36° C. The results are shown in Table 2.

EXAMPLE 22

A 300 ml separable flask was charged with 200 ml of a 20% by weight aqueous solution of hydrochloric acid, 30 ml of n-pentane and 0.5 ml of sodium salt of alkylsulfate ester (Gardinol, a trade name) as an emulsifier. In an atmosphere of hydrogen, the above mixture was stirred by a magnetic stirrer at a rotating speed of 500 rpm, and meanwhile, 6.0 g (78.2 mmole-Si) of magnesium silicide was added at a fixed rate of 0.15 g/min. for 40 minutes in the same way as in Example 1. The results are shown in Table 2.

EXAMPLES 23–24

The procedure of Example 22 was repeated except that 0.5 ml of polyoxyethylene alkyl ether (Leonil, a trade name) or alkyltrimethylaminoacetic acid (Betaine) was used as the emulsifier. The results are shown in Table 2.

EXAMPLE 25

The procedure of Example 14 was repeated except that the stirring of the reaction solution was carried out at a rotating speed of 200 rpm and ultrasonic waves

EXAMPLE 26

A 30% by weight aqueous solution of hydrochloric acid was introduced at a rate of 1.5 ml/min. into a 2-liter separable flask containing 200 ml of n-pentane in a hydrogen atmosphere, and meanwhile, the same magnesium silicide as used in Example 11 was simultaneously introduced into the flask at a rate of 0.2 g/min. from another opening. The reaction was carried out with stirring by a homogenizer (monophase 1/6 HP motor rotating speed 2000 rpm), and the reaction temperature was maintained at 0° C. by cooling the reaction mixture with a cooling medium.

Fifteen hours after the starting of introducing hydrochloric acid and magnesium silicide, the reaction was stopped. As a result of the reaction, a slurry-like black solid material formed in the reaction solution, but did not at all affect the proceeding of the reaction. The amount of magnesium silicide introduced was 180 g (2346 mmoles-Si). The product gas was collected by a trap cooled with liquid nitrogen in the same way as in Example 14, and the amounts of monosilane, disilane and trisilane in the collected gas after the reaction were determined by gas chromatography. The amounts of monosilane, disilane and trisilane dissolved in the solvent layer after the reaction were also determined.

The amounts of the monosilane, disilane and trisilane determined were 721, 179, and 58 mmoles, respectively. The total amount of these three silicon hydrides corresponded to 53.4% of silicon in magnesium silicide used in the reaction.

EXAMPLE 27

The same device as used in Example 1 was charged with 200 ml of a 20% by weight aqueous solution of hydrochloric acid, 20 g of diethyl ether and 20 g of difluoroethane. In an atmosphere of hydrogen gas, 6.0 g of magnesium silicide (particle diameter 100 to 200 mesh; 78.2 mmoles-Si) was added at a constant rate over 40 minutes with stirring while the above mixture was refluxed (the reaction temperature about −18° C.) The product gas was collected by a trap cooled with liquid nitrogen. After the end of the reaction (after the end of adding magnesium silicide), the amounts of monosilane, disilane and trisilane in the collected gas were determined by gas chromatography. After the reaction, the temperature was set at −60° C., and the amounts of monosilane, disilane and trisilane dissolved in diethyl ether and difluoroethane were determined by gas chromatography.

The amounts of monosilane, disilane and trisilane determined were 31.8, 7.7, and 2.4 mmoles, respectively. The total amount of the three silicon hydrides corresponded to 69.5% of silicon in magnesium silicide submitted to the reaction.

EXAMPLES 28-39

The procedure of Example 27 was repeated except that each of the solvents indicated in Table 3 was used instead of diethyl ether and difluoroethane, and the reaction was carried out at each of the reaction temperatures indicated in Table 3. The results are shown in Table 3.

COMPARATIVE EXAMPLE 3

The procedure of Example 27 was repeated except that diethyl ether and difluoroethane were not used, and the reaction temperature was changed to $-20°$ C. The results are shown in Table 3.

added with stirring at a fixed rate of 0.3 g/min. over 200 minutes. After the reaction (after termination of adding magnesium silicide), the reaction solution was cooled to 0° C. and left to stand to separate it into two layers. About 1 liter of the diethyl ether layer was separated and taken out of the reactor. The aqueous acid solution layer in the reactor was heated to 80° C. to distill off a small amount of diethyl ether dissolved therein, and then taken out. It was then mixed with the diethyl ether layer. Gases formed during the two-layer separation and the heat-treatment of the aqueous acid solution were collected by a trap (trap (I)) cooled with liquid nitrogen.

The diethyl ether layer after the two-layer separation was distilled by a distillation column having a tray number of 3, and monosilane (b.p. $-112°$ C.) and disilane (b.p. $-14.5°$ C.) were collected by a trap (trap (II)) cooled with liquid nitrogen.

The amounts of monosilane, disilane and trisilane in the traps (I) and (II) and those dissolved in diethyl ether after distillation were determined by gas chromatography. The results are shown in Table 4.

TABLE 3

| | Solvent | | Reaction | Refluxing-during | Amounts of silicon hydrides formed (mmoles) | | | Percentage of $SiH_4$, $Si_2H_6$ and $Si_3H_8$ based on silicon of the |
|---|---|---|---|---|---|---|---|---|
| | Kind | Amount (g) | temperature (°C.) | the reaction | $SiH_4$ | $Si_2H_6$ | $Si_3H_8$ | silicon alloy fed (%) |
| Example | | | | | | | | |
| 28 | Dimethyl ether | 54 | 5 | Yes | 27.5 | 6.7 | 2.2 | 60.7 |
| | Diethyl ether | 30 | | | | | | |
| 29 | Dimethyl ether | 80 | −3 | Yes | 28.5 | 7.0 | 2.3 | 63.2 |
| | Diethyl ether | 30 | | | | | | |
| 30 | Tetrahydrofuran | 30 | 2 | Yes | 27.3 | 6.7 | 2.1 | 60.1 |
| | n-Butane | 20 | | | | | | |
| 31 | Dimethyl ether | 20 | −1 | Yes | 29.0 | 7.1 | 2.4 | 64.5 |
| | Toluene | | | | | | | |
| 32 | Acetone | 20 | 0 | No | 22.8 | 5.7 | 1.8 | 50.6 |
| | Ethylamine | 20 | | | | | | |
| 33 | Acetaldehyde | 10 | −10 | Yes | 26.9 | 6.7 | 2.1 | 59.6 |
| | Dimethyl ether | 30 | | | | | | |
| 34 | Dimethylsilane | 10 | −15 | Yes | 27.1 | 6.7 | 2.1 | 59.8 |
| | Benzene | 30 | | | | | | |
| 35 | Disilane | 10 | −10 | Yes | 25.3 | 6.3* | 2.0 | 56.1 |
| | Heptane | | | | | | | |
| 36 | Dimethyl ether | 40 | −5 | Yes | 27.0 | 6.7 | 2.1 | 59.7 |
| 37 | Difluoroethane | 30 | −24 | Yes | 29.1 | 7.1 | 2.3 | 64.2 |
| 38 | Ethylsilane | 30 | −14 | Yes | 24.2 | 6.0 | 1.9 | 53.6 |
| 39 | Methylamine | 30 | −6 | Yes | 23.9 | 5.8 | 1.9 | 52.7 |
| Comp. Ex. | | | | | | | | |
| 3 | None | 0 | −20 | No | 22.2 | 5.0 | 1.7 | 47.7 |

*The fed $Si_2H_6$ was excluded.

EXAMPLE 40

A 4-liter separable flask was charged with 2 liters of a 20% by weight aqueous solution of hydrochloric acid and 1000 g of diethyl ether. In an atmosphere of hydrogen gas, while the above mixture was refluxed (the reaction temperature 35° C.), 60 g of magnesium silicide (particle diameter 100 to 200 mesh, 782 mmoles-Si) was

EXAMPLES 41-47

The procedure of Example 40 was repeated except that each of the solvents indicated in Table 4 was used instead of diethyl ether, and the reaction was carried out at each of the temperatures indicated in Table 4. The results are also shown in Table 4.

TABLE 4

| Example | Solvent | | Reaction temperature (°C.) | Amounts of silicon hydrides (mmoles) | | | | | |
|---|---|---|---|---|---|---|---|---|---|
| | | | | Trap (I) | | | Trap (II) | | |
| | Kind | Amount (g) | | $SiH_4$ | $Si_2H_6$ | $Si_3H_8$ | $SiH_4$ | $Si_2H_6$ | $Si_3H_8$ |
| 40 | Diethyl ether | 1000 | 35 | 301 | 35 | 4 | 2 | 39 | 3 |
| 41 | Di-n-butyl ether | 500 | 0 | 243 | 25 | 1 | 11 | 34 | 2 |
| 42 | N—Pentane | 500 | 36 | 289 | 20 | 3 | 1 | 48 | 2 |
| 43 | Benzene | 500 | 0 | 263 | 31 | 1 | 2 | 34 | 1 |
| 44 | Triflourotrichloroethane (Flon-113) | 500 | 0 | 274 | 33 | 1 | 1 | 37 | 1 |
| 45 | Diethylsilane | 500 | 0 | 268 | 36 | 2 | 2 | 31 | 2 |

TABLE 4-continued

| | | | | | | | | | |
|---|---|---|---|---|---|---|---|---|---|
| 46 | Triethoxysilane | 500 | 0 | 261 | 40 | 1 | 2 | 23 | 2 |
| 47 | Diethyl ether<br>Trifluorotri-<br>chloroethane | 250<br>250 | 35 | 284 | 32 | 4 | 1 | 34 | 2 |

| Example | Amounts of silicon hydrides (mmoles) Solvent layer | | | Total amount of silicon hydrides (mmoles) | | | Percentage of $SiH_4$, $Si_2H_6$ and $Si_3H_8$ based on silicon of of the silicon alloy (%) |
|---|---|---|---|---|---|---|---|
| | $SiH_4$ | $Si_2H_6$ | $Si_3H_8$ | $SiH_4$ | $Si_2H_6$ | $Si_3H_8$ | |
| 40 | 0 | 1 | 16 | 303 | 74 | 23 | 66.5 |
| 41 | 2 | 2 | 16 | 256 | 61 | 19 | 55.6 |
| 42 | 0 | 1 | 16 | 290 | 69 | 21 | 62.8 |
| 43 | 0 | 2 | 18 | 265 | 67 | 20 | 58.7 |
| 44 | 0 | 1 | 20 | 275 | 71 | 22 | 61.8 |
| 45 | 0 | 1 | 16 | 270 | 68 | 20 | 59.6 |
| 46 | 1 | 4 | 21 | 264 | 67 | 24 | 60.1 |
| 47 | 1 | 2 | 13 | 286 | 68 | 19 | 61.3 |

What is claimed is:

1. A process for producing silicon hydrides represented by the general formula $Si_nH_{2n+2}$ wherein n is a positive integer of 1 to 6, which comprises reacting a silicon-containing alloy with an aqueous solution of an acid in the presence of at least one inert solvent having a boiling range of from −60° C. to 250° C. selected from the group consisting of an ether, hydrocarbon, a halogenated hydrocarbon, a ketone, an aldehyde, an amine, a silicon hydride and an organosilicon compound.

2. The process of claim 1 wherein the inert organic solvent is a linear or cyclic ether compound having at least one ether group (C—O—C linkage) in the molecule.

3. The process of claim 1 wherein the inert organic solvent is selected from the group consisting of a saturated hydrocarbon, its halogenation product, an unsaturated hydrocarbon and its halogenated product.

4. The process of claim 1 wherein the amount of the inert organic solvent is 0.001 to 1000 times the volume of the aqueous acid solution in the reaction system.

5. The process of claim 1 wherein the reaction is carried out at a temperature of −60°C. to 150° C.

6. The process of claim 5 wherein the reaction is carried out at the boiling point of the inert organic solvent.

7. The process of claim 6 wherein the reaction temperature is controlled by refluxing the inert organic solvent.

8. The process of claim 7 wherein the refluxing is carried out by a reflux condenser provided above the reactor.

9. The process of claim 1 wherein during or after the reaction, the resulting silicon hydrides are separated from the reaction system as gases and collected as such.

10. The process of claim 1 wherein after the reaction, the reaction mixture is separated into an inert organic solvent layer containing the resulting silicon hydrides dissolved therein and an aqueous acid solution layer, and the organic solvent layer is distilled to recover the silicon hydrides.

11. The process of claim 1 wherein the reaction is carried out at a temperature of −60° C. to 150° C.

12. The process of claim 2 wherein the reaction is carried out at a temperature of −60° C. to 150° C.

13. The process of claim 3 wherein the reaction is carried out at a temperature of −60° C. to 150° C.

14. The process of claim 4 wherein the reaction is carried out at a temperature of −60° C. to 150° C.

15. The process of claim 1 wherein during or after the reaction, the resulting silicon hydrides are separated from the reaction system as gases and collected as such.

16. The process of claim 2 wherein during or after the reaction, the resulting silicon hydrides are separated from the reaction system as gases and collected as such.

17. The process of claim 3 wherein during or after the reaction, the resulting silicon hydrides are separated from the reaction system as gases and collected as such.

18. The process of claim 4 wherein during or after the reaction, the resulting silicon hydrides are separated from the reaction system as gases and collected as such.

19. The process of claim 1 wherein after the reaction, the reaction mixture is separated into an inert organic solvent layer containing the resulting silicon hydride, dissolved therein and an aqueous acid solution layer, and the organic solvent layer is distilled to recover the silicon hydrides.

20. The process of claim 2 wherein after the reaction, the reaction mixture is separated into an inert organic solvent layer containing the resulting silicon hydrides dissolved therein and an aqueous acid solution layer, and the organic solvent layer is distilled to recover the silicon hydrides.

21. The process of claim 3 wherein after the reaction, the reaction mixture is separated into an inert organic solvent layer containing the resulting silicon hydrides dissolved therein and an aqueous acid solution layer, and the organic solvent layer is distilled to recover the silicon hydrides.

22. The process of claim 4 wherein after the reaction, the reaction mixture is separated into an inert organic solvent layer containing the resulting silicon hydridges dissolved therein and an aqueous acid solution layer, and the organic solvent layer is distilled to recover the silicon hydrides.

* * * * *